Patented Apr. 9, 1946

2,397,942

UNITED STATES PATENT OFFICE 2,397,942

THERMOPLASTIC COMPOSITIONS

Ernest Francis Brookman and Laurence Michael Smith, Welwyn Garden City, England, assignors to Imperial Chemical Industries Limited, a corporation of Great Britain No Drawing. Application April 1, 1943, Serial No. 481,496. In Great Britain April 3, 1942

8 Claims. (Cl. 260—36)

This invention relates to thermoplastic compositions having a basis of polyvinyl halide. More particularly, it relates to compositions comprising a mixture of polyvinyl halide and plasticiser in the form of a shapeable paste or dough and adapted to be gelatinised in its shaped form to a solid article. This invention relates also to articles so manufactured.

Polyvinyl halides have been frequently proposed and used as thermoplastic materials and when used in this manner have frequently been admixed with plasticisers for the purpose of obtaining desired flexibility in the finished article. One particularly advantageous known manner of working with a mixture of polyvinyl halide and plasticiser consists in preparing a paste of finely divided polyvinyl halide and plasticiser (said plasticiser being of low volatility and being also capable of dissolving the halide at elevated temperatures), shaping said paste and subsequently gelatinising said paste by the application of heat, whereupon a solid, but not brittle, article is obtained.

The above method, whilst giving useful and valuable articles, suffers from the disadvantage that the paste of polymer and plasticiser is not very stable, and on storage tends to "set-up" into a partially gelatinised material which will not work readily. Despite this tendency, a further disadvantage in the above method is that a rather high temperature (ca. 150° C.) is required for rapid and complete gelatinisation to a strong composition of high abrasion resistance. Such a high temperature may cause slight decomposition of the polymer, with undesirable effects upon material with which the paste is at the time in contact or the high temperature may itself directly harm any heat-sensitive materials with which the paste is in contact.

It is an object of this invention to provide a paste comprising essentially polyvinyl halide and plasticiser, which paste shall be stable during storage and shall be capable of gelatinisation at temperatures considerably below 150° C. to form products of satisfactory strength and abrasion resistance.

We have now found that the above objects are accomplished by providing a paste comprising a polyvinyl halide, an aromatic tri-ester of phosphoric acid, a minor proportion of a glycol ether phthalate and a minor proportion of a hard thermoplastic polymer other than a polyvinyl halide which is soluble in a mixture of said aromatic tri-ester and said glycol ether phthalate, the proportions of said aromatic tri-ester, of said glycol ether phthalate and of said hard thermoplastic polymer being such that they together form a liquid of viscosity not exceeding 60 poises at 25° C., and the proportion of polyvinyl halide in said paste being 30%–65% by weight.

In preparing our newly proposed pastes, we prefer first to dissolve the hard thermoplastic polymer in a previously prepared mixture of the aromatic tri-ester and glycol ether phthalate and to use the resultant product as a plasticiser for the polyvinyl halide. Thus, the resultant product may be mixed with the polyvinyl halide to form a paste by any known method and in known mixing apparatus. If desired, the initial mixing may be conducted at elevated temperature, but the final mixing with the polyvinyl halide should be conducted at a temperature not substantially exceeding 30° C.

The proportion of glycol ether phthalate should be about 20% based on the combined weights of aromatic tri-ester and glycol ether phthalate and with these proportions, the amount of hard thermoplastic polymer to be added to obtain a solution of which the viscosity is within the limits specified above may vary between about 0.5% and 10% (calculated on the combined weight of the aromatic tri-ester and the glycol ether phthalate) depending upon the nature and molecular weight of the thermoplastic polymer.

Suitable hard thermoplastic polymers are, for example, cellulose acetate, nitro-cellulose, polyvinyl acetate, thermoplastic alkyd resins (such as those sold under the registered trade mark "Paralac" 385, a thermoplastic non-drying oil alkyd resin; (see 1943 Edition of "Synthetic Resins and Allied Plastics" by Morrell)), polymethylmethacrylate, polymethylacrylate, and polystyrene. In general, most high polymers of those monomers which contain the grouping $CH_2=C<$ are suitable with the exception of polyvinyl halides. Suitable hard thermoplastic interpolymers are, for example, those formed from vinyl acetate and methylmethacrylate. Preferably we use polymethylmethacrylate as sold under the registered trade mark "Diakon."

For the remaining constituents of our pastes we prefer as polyvinyl halide polyvinyl chloride, as aromatic tri-ether, tri-cresyl phosphate, and as glycol ether phthalate, the phthalate of ethylene glycol mono-methyl ether. Preferably, the polyvinyl chloride should have been prepared by the so-called "emulsion" process and should contain some emulsifying agent. Our newly proposed pastes are mobile and readily capable of being spread or otherwise applied to surfaces. They retain this mobility over long periods of time at room temperature and consequently store well. These pastes are readily converted into tough, flexible, abrasion-resistant material on gelatinisation by heat at temperatures as low as 110° C. The period of heating required for complete gelatinisation need be only quite short, e. g., 10 minutes.

Any of the customary pigments, fillers and stabilisers may be incorporated in our newly proposed compositions, and compositions containing such bodies are within the scope of our invention.

In order that our invention may be better understood, we give the following examples, it being understood that our invention is in no way limited thereby. The parts are by weight.

Example I

The following pastes were prepared from polyvinyl chloride obtained by polymerising vinyl chloride in emulsion, coagulating said emulsion, and filtering, washing and drying the polymer.

(A) According to the prior art.

| | Parts |
|---|---|
| Polyvinyl chloride | 50 |
| Tri-cresyl phosphate | 50 |

The above ingredients were intimately mixed in an edge-runner, by adding the polymer to the plasticiser at 20° C. Mixing was continued until a smooth paste was formed. This paste could be gelatinised to give a mechanically strong composition by heating at 150° C. for 30 minutes, but heating at 111° C. even for as long as 24 hours produced only a weak material of cheesy consistency having very low abrasion resistance.

(B) According to the present invention.

| | Parts |
|---|---|
| Polyvinyl chloride | 50 |
| Tri-cresyl phosphate | 40 |
| Phthalate of ethylene glycol mono-methyl ether | 10 |
| "Diakon" | 2 |

The three last mentioned ingredients were thoroughly mixed in a jacketed steel vessel fitted with an achor stirrer at 120° C. until solution of the "Diakon" was complete. This solution was then mixed with the polyvinyl chloride by addition of the polyvinyl chloride to said solution at 20° C. in an edge-runner until a smooth mobile paste was obtained.

This paste, unlike that described in (A) above was converted on heating at 110° C. for 10 minutes into a tough, flexible composition having good abrasion-resistance and tear-resistance.

Example II 200 parts of a 30% aqueous emulsion of polyvinyl chloride were mixed with 8 parts of a 30% aqueous emulsion of polymethylmethacrylate and the water removed by evaporation. The resultant solid mass was disintegrated and 52 parts of the disintegrated solid mixed with 2 parts of lead silicate, which had previously been passed through a 100 B. S. S. sieve, and the mixture milled in a ball mill for 6 hours. The milled solid was sieved through a 100 B. S. S. sieve and the sieved material thoroughly mixed with 40 parts of tricresyl phosphate and 10 parts of the phthalate of ethylene glycol mono-methyl ether in an edge runner at 20° C. until a smooth mobile paste was obtained.

Example III 20 parts of a 10% solution of "Paralac" 385 in a 25/75 acetone-water mixture were added to 166 parts of a 30% aqueous emulsion of polyvinyl chloride and the liquids removed by evaporation. The resultant solid mass was disintegrated and 52 parts used to prepare a paste using the procedure and proportions given in Example II.

Having now particularly described and ascertained the nature of our said invention and in what manner the same is to be performed, we declare that what we claim is:

1. New and improved pastes comprising a polyvinyl halide consisting of polymerized vinyl halide, an aromatic tri-ester of phosphoric acid, a minor proportion of a glycol ether phthalate and a minor proportion of a hard thermoplastic polymer other than a polyvinyl halide which is soluble in a mixture of said aromatic tri-ester and said glycol ether phthalate, the proportions of said aromatic tri-ester, of said glycol ether phthalate and of said hard thermoplastic polymer other than polyvinyl halide being such that they together form a liquid of viscosity not exceeding 60 poises at 25° C., and the proportion of polyvinyl halide in said paste being 30–65% by weight, said polyvinyl halide being insoluble in the composition at room temperature.

2. New and improved pastes as claimed in claim 1 in which the polyvinyl halide is polyvinyl chloride.

3. New and improved pastes as claimed in claim 1 in which the aromatic tri-ester of phosphoric acid is tri-cresyl phosphate.

4. New and improved pastes as claimed in claim 1 in which the glycol ether phthalate is the phthalate of ethylene glycol monomethyl ether.

5. New and improved pastes as claimed in claim 1 in which the hard thermoplastic polymer is polymethyl methacrylate.

6. New and improved pastes as claimed in claim 1 in which the hard thermoplastic polymer is a thermoplastic alkyd resin.

7. New and improved pastes as claimed in claim 1 in which the proportion of hard thermoplastic polymer used is between 0.5 and 10%, calculated on the combined weight of the aromatic tri-ester and the glycol ether phthalate.

8. New and improved pastes as claimed in claim 1 in which the proportion of glycol ether phthalate is about 20% based on the combined weights of aromatic tri-ester and glycol ether phthalate.

ERNEST FRANCIS BROOKMAN.
LAURENCE MICHAEL SMITH.

Certificate of Correction

Patent No. 2,397,942. April 9, 1946.

ERNEST FRANCIS BROOKMAN ET AL.

It is hereby certified that error appears in the printed specification of the above numbered patent requiring correction as follows: Page 1, second column, line 48, for "tri-ether" read *tri-ester*; and that the said Letters Patent should be read with this correction therein that the same may conform to the record of the case in the Patent Office.

Signed and sealed this 2d day of July, A. D. 1946.

[SEAL]

LESLIE FRAZER,
*First Assistant Commissioner of Patents.*